(12) United States Patent
Yoshima et al.

(10) Patent No.: US 10,388,981 B2
(45) Date of Patent: Aug. 20, 2019

(54) NON-AQUEOUS ELECTROLYTE BATTERY, NON-AQUEOUS ELECTROLYTE BATTERY PACK, AND VEHICLE

(71) Applicant: Kabushiki Kaisha Toshiba, Minato-ku (JP)

(72) Inventors: Kazuomi Yoshima, Yokohama (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 290 days.

(21) Appl. No.: 15/392,037

(22) Filed: Dec. 28, 2016

(65) Prior Publication Data

US 2017/0271708 A1 Sep. 21, 2017

(30) Foreign Application Priority Data

Mar. 17, 2016 (JP) .................................. 2016-053342

(51) Int. Cl.
*H01M 10/04* (2006.01)
*H01M 10/0525* (2010.01)
(Continued)

(52) U.S. Cl.
CPC ..... *H01M 10/0418* (2013.01); *H01M 2/1077* (2013.01); *H01M 10/0525* (2013.01);
(Continued)

(58) Field of Classification Search
CPC ...................... H01M 10/0418; H01M 10/0583
See application file for complete search history.

(56) References Cited

U.S. PATENT DOCUMENTS

| 2011/0274960 A1* | 11/2011 | Ahn ...................... H01M 2/021 429/136 |
| 2012/0156569 A1 | 6/2012 | Kia et al. |

(Continued)

FOREIGN PATENT DOCUMENTS

| CN | 105322144 A | 2/2016 |
| JP | 2005-93375 | 4/2005 |

(Continued)

OTHER PUBLICATIONS

Yun-Chae Jung et al. "All Solid-State Lithium Batteries Assembled with Hybrid Solid Electrolytes", Journal of the Electrochemical Society 162 (4), 2015, 7 pages.
(Continued)

*Primary Examiner* — Stephan J Essex
(74) *Attorney, Agent, or Firm* — Oblon, McClelland, Maier & Neustadt, L.L.P.

(57) ABSTRACT

A non-aqueous electrolyte battery is provided with a bipolar electrode unit and an insulating layer including non-aqueous electrolyte. The insulating layer covers positive and negative electrode active material layers on both side surfaces of a current collector of a bipolar electrode of the unit. The unit is folded at every predetermined length to have flat portions arranged to face each other and bent portions arranged between the flat portions to connect the flat portions. A thickness of one part of the insulating layer of the electrode, the one part being positioned on an outer side surface of each bent portion, is set to be larger than a thickness of the other part of the insulating layer, the other part being positioned on each flat portion.

16 Claims, 7 Drawing Sheets

(51) Int. Cl.
    *H01M 10/0583* (2010.01)
    *H01M 10/42* (2006.01)
    *H01M 10/48* (2006.01)
    *H01M 2/10* (2006.01)

(52) U.S. Cl.
    CPC ..... *H01M 10/0583* (2013.01); *H01M 10/425* (2013.01); *H01M 10/48* (2013.01); *H01M 2010/4271* (2013.01); *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2013/0017425 A1 | 1/2013 | Watanabe et al. |
| 2014/0087295 A1 | 3/2014 | Gila et al. |
| 2015/0030905 A1 | 1/2015 | Mizuno et al. |
| 2015/0072249 A1 | 3/2015 | Yamamoto et al. |
| 2015/0270522 A1 | 9/2015 | Yamada et al. |
| 2015/0340731 A1 | 11/2015 | Kim et al. |
| 2015/0357671 A1 | 12/2015 | Park et al. |
| 2016/0036090 A1 | 2/2016 | Sasakawa et al. |

FOREIGN PATENT DOCUMENTS

| | | |
|---|---|---|
| JP | 2011-8929 A | 1/2011 |
| JP | 5066849 | 11/2012 |
| JP | 2013-191389 | 9/2013 |
| JP | 5616296 | 10/2014 |
| JP | 2015-79742 | 4/2015 |
| JP | 2015-126020 A | 7/2015 |
| JP | 2015-128019 A1 | 7/2015 |
| JP | 2015-128021 A1 | 7/2015 |
| JP | 2016-33895 A | 3/2016 |
| JP | 2017-041439 A | 2/2017 |
| WO | WO 2013/069399 A1 | 5/2013 |
| WO | WO 2013/153954 A1 | 10/2013 |
| WO | WO 2014/046094 A1 | 3/2014 |
| WO | WO 2016/113863 A1 | 7/2016 |

OTHER PUBLICATIONS

Yun-Chae Jung et al. "Ceramic separators based on $Li^+$-conducting inorganic electrolyte for high-performance lithium-ion batteries with enhanced safety", Journal of Power Sources 293, 2015, 9 pages.

Extended European Search Report dated Apr. 13, 2017 in Patent Application No. 17154772.2.

* cited by examiner

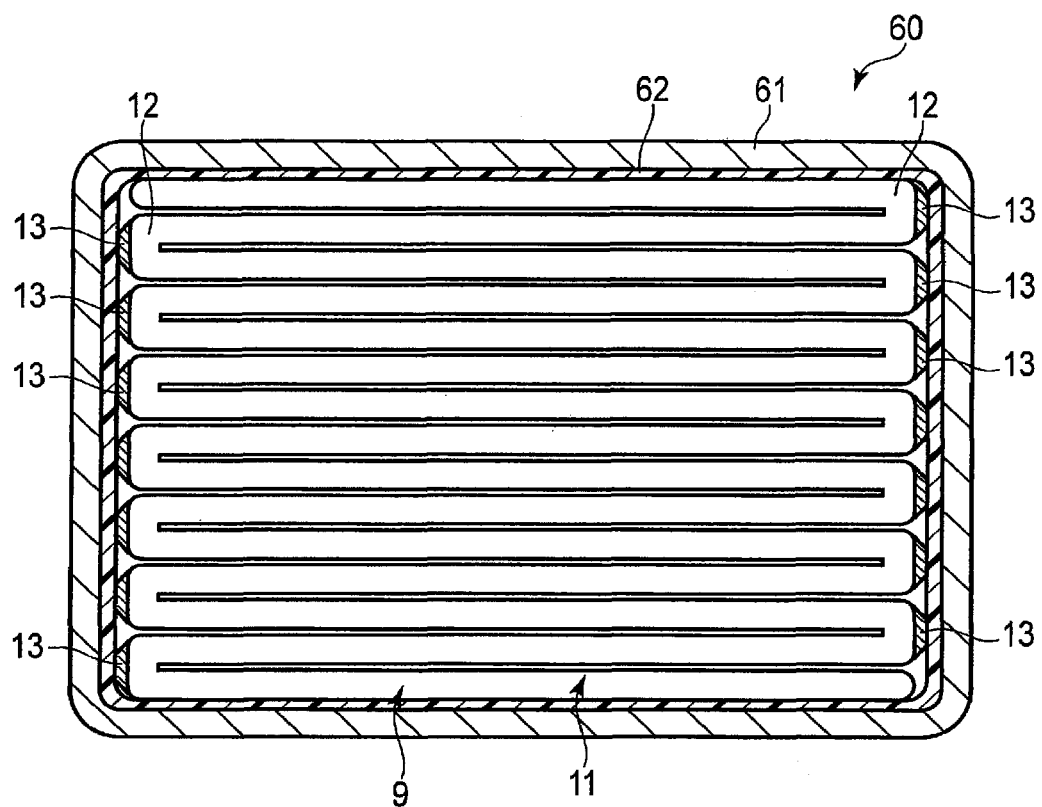
F I G. 1

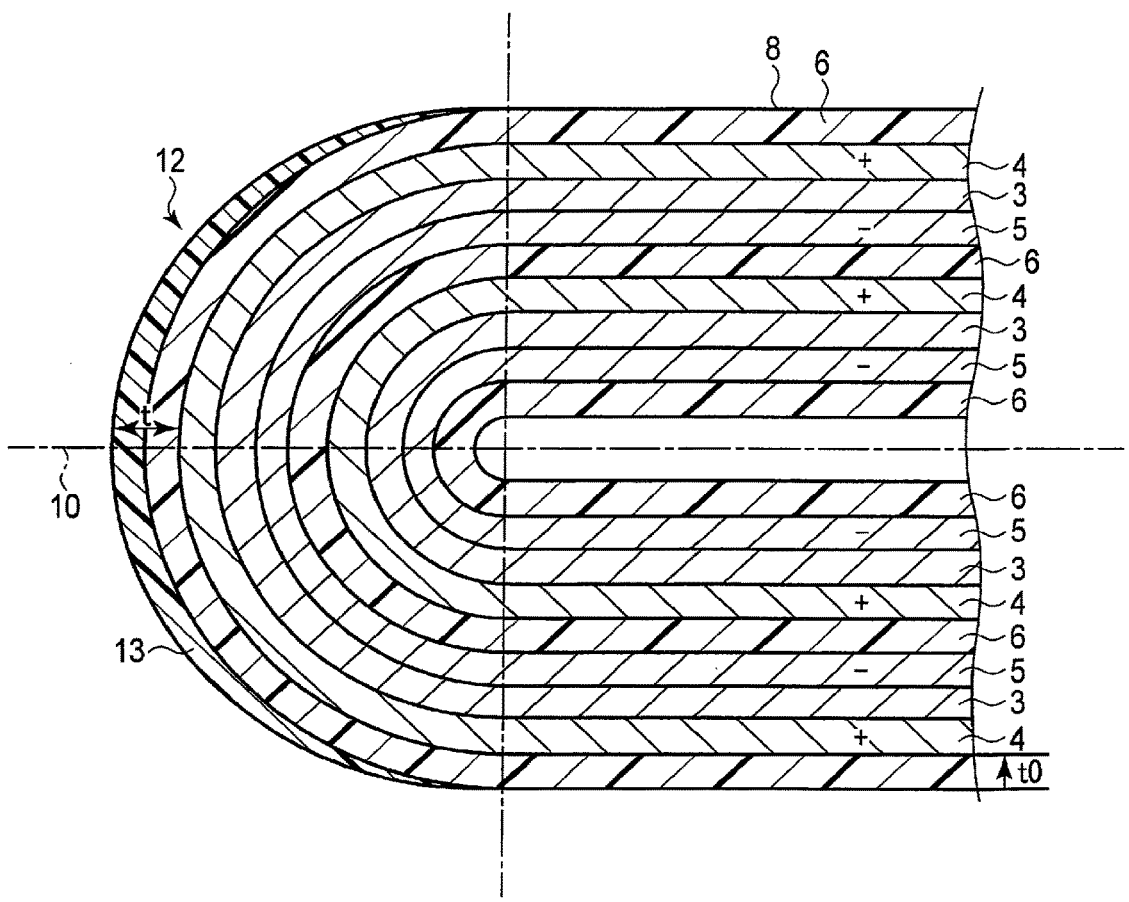
F I G. 4

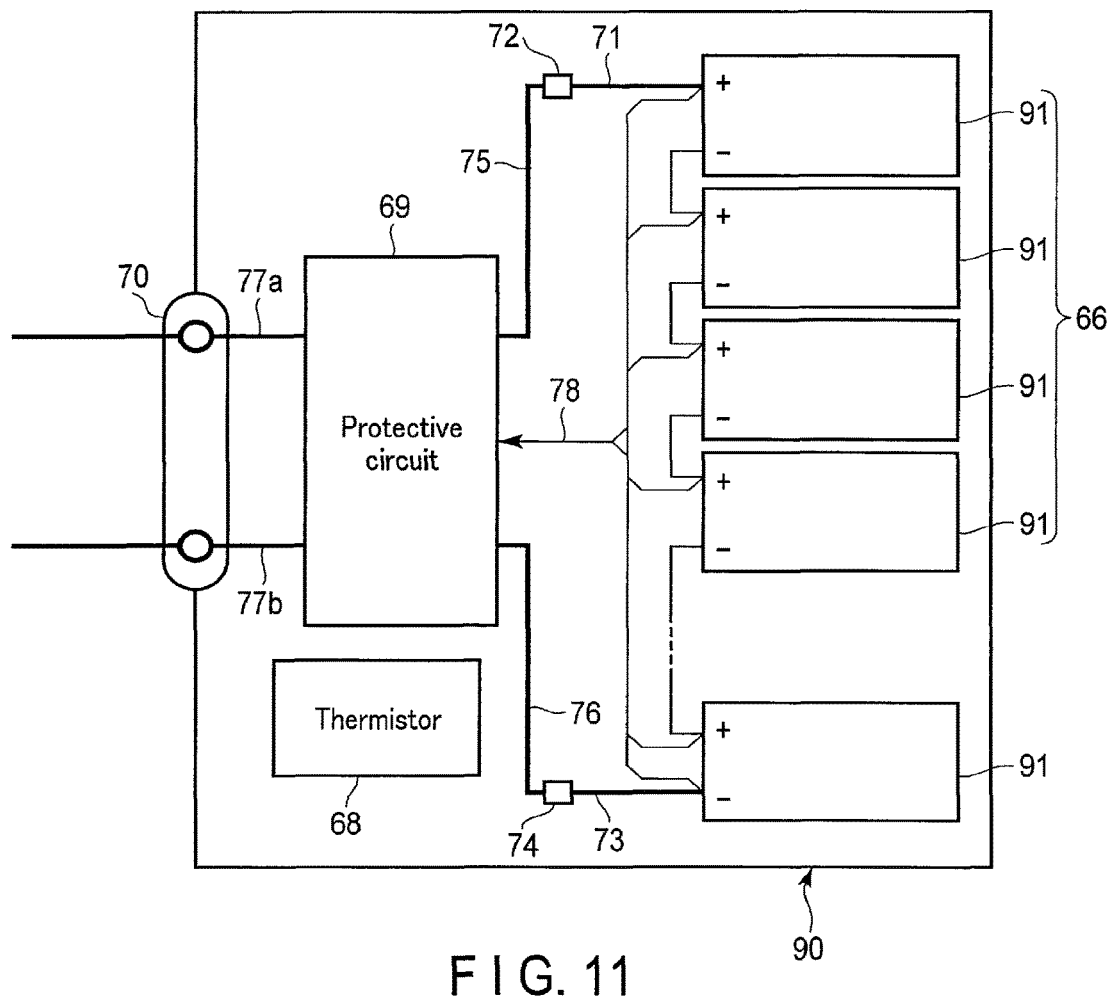
F I G. 11
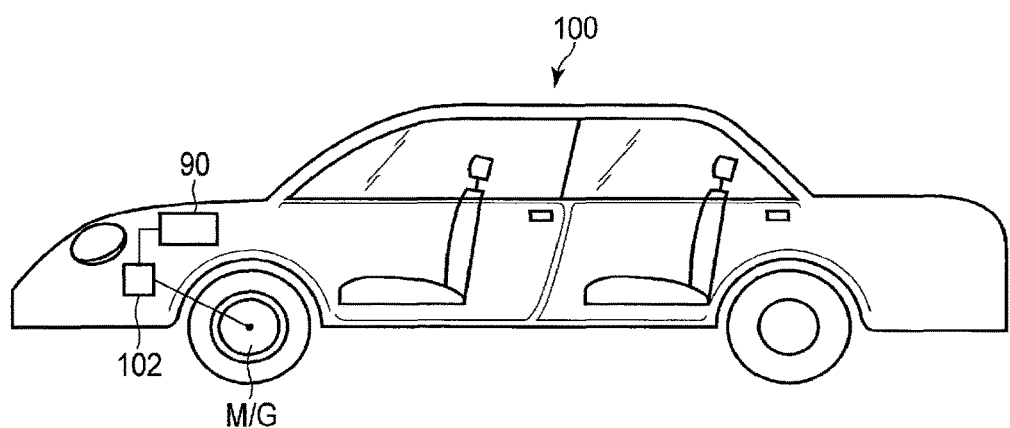
F I G. 12

NON-AQUEOUS ELECTROLYTE BATTERY, NON-AQUEOUS ELECTROLYTE BATTERY PACK, AND VEHICLE

CROSS-REFERENCE TO RELATED APPLICATIONS

This application is based upon and claims the benefit of priority from Japanese Patent Application No. 2016-053342, filed Mar. 17, 2016, the entire contents of which is incorporated herein by reference.

FIELD

Embodiments described herein relates generally to a non-aqueous electrolyte battery, a non-aqueous electrolyte battery pack, and a vehicle.

BACKGROUND

In recent years, research and development of lithium ion secondary batteries is actively conducted as a high energy-density battery. Lithium ion secondary batteries are expected to be used as an electric source of vehicles such as hybrid vehicles and electric vehicles or as an uninterruptible power supply of mobile phone base stations. However, even if a cell of a lithium ion secondary battery is made larger in size, the voltage obtained from the cell of the lithium ion secondary battery is a low voltage of about 3.7 V. Thus, to obtain a high output from a power supply using the cell of the lithium ion secondary battery, a power supply in which many cells of the lithium ion secondary battery are connected in series needs to be used. As a result, a size of the power supply grows becomes larger.

A bipolar battery is proposed as a cell that can be made smaller in size relative to its output. The bipolar battery uses a plurality of bipolar electrodes, each of which includes a current collector, a positive electrode active material layer formed on one side surface of the current collector, and a negative electrode active material layer formed on the other side surface of the current collector. These bipolar electrodes are arranged with an electrolytic layer being interposed between them and electrically connected in series. Since the plural bipolar electrodes are electrically connected in series in the bipolar battery, high power of a high-voltage and constant current can be obtained and further an electric resistance in the battery is small.

A lithium ion secondary battery uses a liquid electrolyte. And, positive electrodes and negative electrodes are repeated in one cell of the bipolar battery. Thus, if the liquid electrolyte used for the lithium ion secondary battery is applied to the bipolar battery, a short-circuit (liquid junction) may be caused by ionic conduction between the positive electrode and the negative electrode. Therefore, a structure of the cell of the lithium ion secondary battery using the liquid electrolyte cannot be adopted as a structure of the cell of the bipolar battery.

Heretofore, a bipolar battery using a polymeric solid electrolyte that does not include a liquid electrolyte has been proposed. Since the bipolar battery with this structure does not use the liquid electrolyte, there is no possibility of the short-circuit (liquid junction) due to the ionic conduction of the liquid electrolyte between the plurality of bipolar electrolytes. In general, however, an ionic conductance of the solid electrolyte is about ⅒ to ¹⁄₁₀₀ of that of the liquid electrolyte and is very low in comparison with that of the liquid electrolyte. Therefore, an output density of the bipolar battery in this structure is low and the bipolar battery in this structure is not yet in actual use.

In view of the above circumstances, a bipolar battery using a gel electrolyte obtained by making a liquid electrolyte being semisolid is proposed. The gel electrolyte is produced by soaking an electrolytic solution into a polymer such as polyethylene oxide (PEO), polyvinylidene difluoride (PVdF), etc. Since the gel electrolyte has a high ionic conductivity, an output density of a bipolar battery using the gel electrolyte can also be expected to be high.

To make the bipolar battery using the gel electrolyte, which is as a kind of non-aqueous electrolyte battery, being a high energy-density battery like the lithium ion secondary battery, it is considered to fold a sheet of the bipolar electrode in a zigzag pattern. In such a case, however, an insulating layer on an outer surface side of a folded portion (bent portion) of the bipolar electrode is likely to be cracked. If the insulating layer is cracked, an internal short-circuit occurs in the folded portion (bent portion).

BRIEF DESCRIPTION OF THE DRAWINGS

FIG. 1 is a schematic sectional view of the whole of a non-aqueous electrolyte battery according to a first embodiment;

FIG. 4 is an enlarged sectional view of a bent portion of the bipolar electrode folded in a zigzag pattern and used in the non-aqueous electrolyte battery in FIG. 1;

FIG. 11 is a block diagram schematically showing an electric circuit of the battery pack in FIG. 10; and FIG. 12 is a schematic side view schematically showing an example of an automobile that is a kind of a vehicle and that comprises the battery pack of the non-aqueous electrolyte batteries according to the first embodiment and shown in FIG. 10.

DETAILED DESCRIPTION

Figure 2:
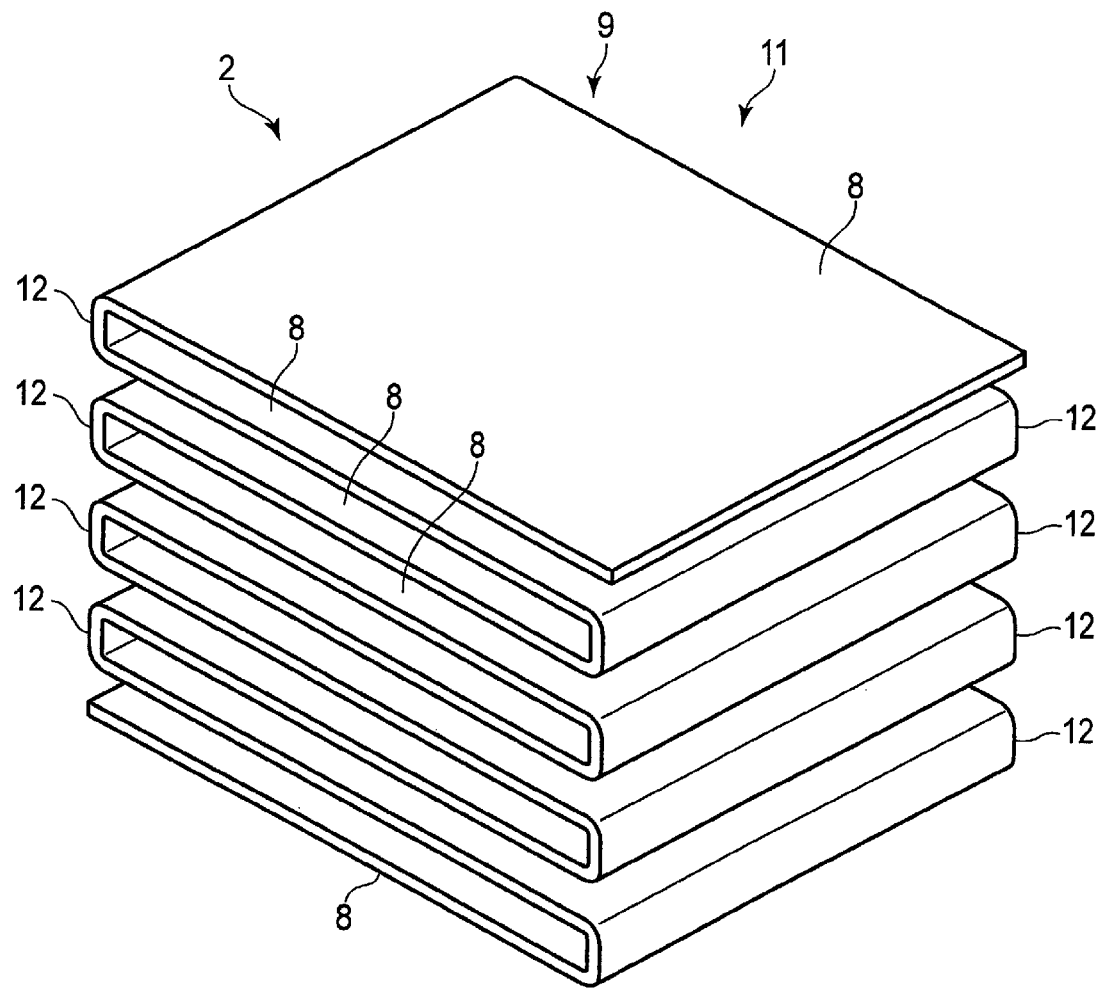
FIG. 2 is a schematic perspective view of the whole of a bipolar electrode folded in a zigzag pattern and used in the non-aqueous electrolyte battery in FIG. 1.

A non-aqueous electrolyte battery according to one embodiment comprises a bipolar electrode unit including at least a bipolar electrode. The bipolar electrode includes a current collector including one side surface and the other side surface, a positive electrode active material layer provided on the one side surface of the current collector, and a negative electrode active material layer provided on the other side surface of the current collector. The non-aqueous electrolyte battery further comprises an insulating layer covering the positive and negative electrode active material layers on the one and the other side surfaces of the current collector of the bipolar electrode and including a non-aqueous electrolyte. The bipolar electrode unit is folded at every predetermined length to have a plurality of flat portions arranged to face each other and a plurality of bent portions arranged between the flat portions. Each flat portion has one and the other ends in a direction of the predetermined length, and each bent portion connects one of the one and the other ends of one of the two flat portions facing each other and the other of the one and the other ends of the other of the two flat portions. And, a thickness of one part of the insulating layer of the bipolar electrode, the part being positioned on at least an outer side surface of each of the bent portions of the bipolar electrode unit, is set to be larger than a thickness of the other part of the insulating layer, the other part being positioned on each of the flat portions.

A non-aqueous electrolyte battery pack according to one embodiment comprises a plurality of non-aqueous electrolyte batteries bound together. The non-aqueous electrolyte batteries are electrically connected in series, in parallel, or in a combination of in series and in parallel. The non-aqueous electrolyte battery pack further comprises a pair of positive electrode side lead and negative electrode side lead common to the non-aqueous electrolyte batteries, and a protective circuit connected to the non-aqueous electrolyte batteries and configured to detect an abnormal operation of the non-aqueous electrolyte batteries and to avoid the abnormal operation of the non-aqueous electrolyte batteries. Each of the non-aqueous electrolyte batteries includes a case having an internal space and a bipolar electrode unit arranged in the internal space of the case. The bipolar electrode unit includes at least a bipolar electrode. The bipolar electrode includes a current collector including one side surface and the other side surface, a positive electrode active material layer provided on the one side surface of the current collector, and a negative electrode active material layer provided on the other side surface of the current collector. Each of the non-aqueous electrolyte batteries further includes an insulating layer covering the positive and negative electrode active material layers on the one and the other side surfaces of the current collector of the bipolar electrode and including a non-aqueous electrolyte. The bipolar electrode unit is folded at every predetermined length to have a plurality of flat portions arranged to face each other and a plurality of bent portions arranged between the flat portions. Each flat portion has one and the other ends in a direction of the predetermined length, and each bent portion connects one of the one and the other ends of one of the two flat portions facing each other and the other of the one and the other ends of the other of the two flat portions. And, a thickness of one part of the insulating layer of the bipolar electrode, the part being positioned on at least an outer side surface of each of the bent portions of the bipolar electrode unit, is set to be larger than a thickness of the other part of the insulating layer, the other part being positioned on each of the flat portions.

A vehicle according to one embodiment comprises the battery pack of the one embodiment.

Hereinafter, non-aqueous electrolyte batteries, which relate to various embodiments and each of which uses a bipolar electrode, a non-aqueous electrolyte battery pack which relate to one embodiment and an automobile which relate to one embodiment will be described with reference to drawings. The same reference numerals are attached to common components throughout the various embodiments and a duplicate description thereof is omitted. Each figure is a schematic view to describe an embodiment and to promote an understanding thereof. A shape, dimensions or scale ratios of an embodiment shown in each figure is different from a shape, dimensions or scale ratios of an actual apparatus. The shape, dimensions or scale ratios of the actual apparatus may be appropriately changed in consideration of descriptions below and publicly known technology.

First Embodiment

Hereinafter, a non-aqueous electrolyte battery according to a first embodiment and using a bipolar electrode will be described with reference to FIGS. 1 to 5. FIG. 1 is a sectional view schematically showing a structure of a non-aqueous electrolyte battery 60 according to the first embodiment and using a bipolar electrode. The non-aqueous electrolyte battery 60 according to the present embodiment includes a container member (case) 61 of an approximately rectangular shape, a bipolar electrode 11 housed in the container member 61 and insulating layers (not shown in FIG. 1) provided on both side surfaces of the bipolar electrode 11. The insulating layer includes a non-aqueous electrolyte. The container member 61 is formed of, for example, a laminated film in which a metal layer is interposed between two resin films.

Figure 3:
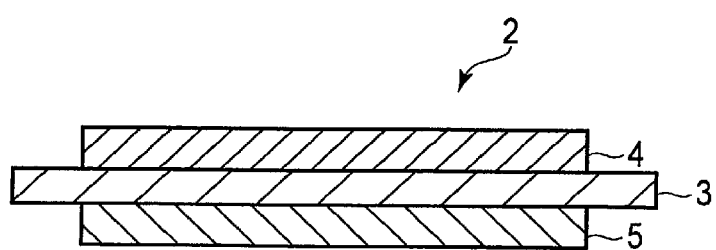
FIG. 3 is a schematic sectional view of a basic structure of the bipolar electrode in FIG. 2.

FIG. 2 is a schematic perspective view of the whole of the bipolar electrode 11 according to the first embodiment and folded in zigzag. The bipolar electrode 11 is provided with the insulating layers. FIG. 3 schematically shows an electrode body 2 as a basic structure of the bipolar electrode 11 in a state before the bipolar electrode 11 is folded in zigzag. As shown in FIG. 3, the electrode body 2 of the bipolar electrode 11 includes a current collector 3 of a rectangular plate shape, a positive electrode active material layer 4 formed on one side surface of the current collector 3 and a negative electrode active material layer 5 formed on the other side surface of the current collector 3. That is, the positive electrode active material layer 4 and the negative electrode active material layer 5 are arranged on both sides of the current collector 3.

The bipolar electrode 11 can be used not only in a form of only the electrode body 2 of the basic structure (a single structure) in which, as shown in FIG. 3, the positive electrode active material layer 4 and the negative electrode active material layer 5 are stacked on both sides of the current collector 3, but also in a form of a laminated structure in which a plurality of the electrode bodies 2 of the basic structure shown in FIG. 3 are stacked with the insulating layer as a non-aqueous electrolyte layer interposed therebetween. FIG. 4 shows an example in which the two electrode bodies 2 of the basic structures are stacked in two layers with an insulating layer 6 as a non-aqueous electrolyte layer being interposed between them.

Figure 5:
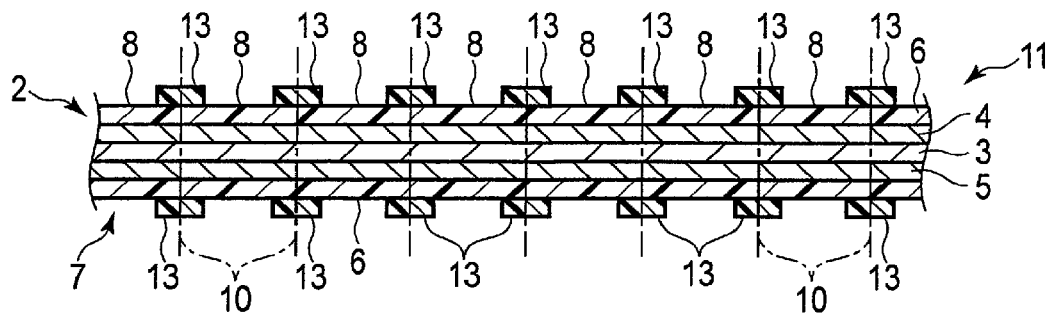
FIG. 5 is a sectional view schematically showing the bipolar electrode of the basic structure in FIG. 3 in a plate-like state before it is folded.

In the present embodiment, as shown in FIG. 5, a plate-like member 7 having the insulating layers 6 covering each of the positive electrode active material layer 4 and the negative electrode active material layer 5 of the bipolar electrode 11 is prepared. Here, the insulating layers 6 are stacked on an upper surface of the positive electrode active material layer 4 of the electrode body 2 and a lower surface of the negative electrode active material layer 5 thereof. The insulating layers 6 are formed by coating an insulating material in an uniform thickness on the upper surface of the positive electrode active material layer 4 of the electrode body 2 and the lower surface of the negative electrode active material layer 5 thereof. FIG. 5 is a sectional view showing a state before the plate-like member 7 of the bipolar electrode 11 of the non-aqueous electrolyte battery 60 according to the first embodiment is folded.

The plate-like member 7 is divided into a plurality of flat portions 8 at every predetermined length in one direction, and portions between the plurality of divided flat portions 8 are successively bent to stack alternately divided flat portions 8 to form a zigzag patterned folding member 9 shown in FIG. 2. In FIG. 5, one-dots chain lines indicate reference lines 10 for dividing the plate member 7. Portions between the flat portions 8 adjacent to each other of the plate-like member 7 are successively bent to orient alternately in opposing directions at the reference lines 10.

For example, one sheet of the plate-like member 7 of a square shape whose one side has a length of 45 cm is divided along the one side, for example, at every 5 cm. Accordingly, the sheet of the plate-like member 7 is divided into nine flat portions 8 each having a predetermined length of 5 cm. Then, portions between the nine flat portions 8 obtained by dividing the plate-like member 7 as described above are successively bend to orient alternately in opposing directions and to form the zigzag patterned folding member 9. And, the bent portion between the flat portions 8 adjacent to each other is called as a bent portion 12. The bent portion 12 is bent by using the reference line 10 as an axis of symmetry. The bent portion 10 bent by using the axis of symmetry is an enantiomer so that both side parts of the bent portion 10 in both sides of the reference line 10 are symmetrical. In this case, a bent angle "δ" between the two flat portions 8 adjacent to each other at an intersection of the axis of symmetry with the plate-like member 7 of the bipolar electrode 11 is preferably 0° to 90°.

The bipolar electrode 11 in the present embodiment has a thickness increased portion 13 where a thickness "t" of the insulating layer 6 on the bent portion 12 is thicker than a thickness "t0" of the insulating layer 6 on the flat portion 8. As shown in FIG. 4, the thickness increased portion 13 may be made such that the thickness thereof at the reference line 10 is the largest and the thickness thereof in each side of the reference line 10 is gradually reduced to approach the thickness "t0" of the insulating layer 6 on the flat portion 8. Also, the thickness increased portion 13 may be made such that the thickness thereof only in a part around the reference line 10 is locally larger than the thickness "t0" of the insulating layer 6 on the flat portion 8. Alternatively, the thickness increased portion 13 may be made such that the thickness thereof on the whole of the bent portion 12 is generally larger than the thickness "t0" of the insulating layer 6 on the flat portion 8. FIG. 4 shows the structure in which the thickness increased portion 13 is provided in a part of the insulating layer 6 that is located in the outermost of the bent portion 12. However, in a case that a plurality of the electrode bodies 2 each having the basic structure are stacked in a plurality of layers and the stacked electrode bodies 2 are used as a bipolar electrode, the thickness increased portion 13 may be provided in the insulating layer 6 between the electrode bodies 2 of the plurality of layers.

In the present embodiment, the insulating layer 6 of the bipolar electrode 11 has a first stage of the insulating layer 6 formed by coating the surfaces of the positive electrode active material layer 4 and negative electrode active material layer 5 with an insulating material in a uniform thickness. Then, the thickness increased portion 13 is formed on a part of the first step of the insulating layer 6 corresponding to the bent portion 12 by a pattern-coating of an insulating material.

Next, an operation and effect of the non-aqueous electrolyte battery 60 according to the first embodiment having the above described structure will be described. The non-aqueous electrolyte battery 60 according to the present embodiment is provided with the thickness increased portion 13 the thickness "t" of which on each of the bent portions 12 of the zigzag patterned folding member 9 is thicker than the thickness "t0" of the insulating layer 6 on each of the flat portions 8 of the zigzag patterned folding member 9. Thus, if the electrode body 2 or the insulating layer 6 at the bent portion 12 is cracked when the zigzag patterned folding member 9 of the bipolar electrode 11 is formed, the positive electrode active material layer 4 and the negative electrode active material layer 5 can be prevented from coming into contact with each other by the thickness increased portion 13. Accordingly, even the non-aqueous electrolyte battery 60 having the zigzag patterned folding portion 9 can prevent an internal short-circuit from occurring in the position of the bent portion 12 of the zigzag patterned folding portion 9 so that an improvement of the energy density can be implemented.

Hereinafter, the insulating layer 6, the positive electrode active material layer 4, the negative electrode active material layer 5, the non-aqueous electrolyte and the container member 61 of the non-aqueous electrolyte battery 60 according to the first embodiment will be described in more detail.

1) Insulating Layer 6

The insulating layer 6 may substantially be formed from a solid electrolyte according to the first embodiment, but may also be formed by including a non-aqueous electrolyte, a polymer (polymeric material) electrolyte or an ordinary-temperature-molten salt material.

The non-aqueous electrolyte includes a liquid non-aqueous electrolyte prepared by dissolving an electrolyte in an organic solvent and a gel non-aqueous electrolyte in which a liquid electrolyte and a polymeric material are made composite.

The liquid non-aqueous electrolyte is prepared by, for example, dissolving an electrolyte in a concentration from 0.5 mol/L to 2.5 mol/L in an organic solvent. As the electrolyte, for example, lithium salts such as lithium perchlorate ($LiClO_4$), lithium hexafluorophosphate ($LiPF_6$), lithium tetrafluoroborate ($LiBF_4$), lithium hexafluoroarsenic ($LiAsF_6$), lithium trifluoromethanesulfonate ($LiCF_3SO_3$) and lithium bis-trifluoromethyl sulfonylimide ($LiN(CF_3SO_2)_2$) can be cited and also mixtures of these salts can be cited.

The electrolyte is preferably one that is difficult to oxidize even at a high potential, and $LiPF_6$ is particularly preferable. As the organic solvent, a single solvent of, for example, cyclic carbonate such as propylene carbonate (PC), ethylene carbonate (EC) and vinylene carbonate; chain carbonate such as diethyl carbonate (DEC), dimethyl carbonate (DMC) and methylethyl carbonate (MEC); cyclic ether such as tetrahydrofuran (THF), 2-methyl tetrahydrofuran (2MeTHF) and dioxolane (DOX); chain ether such as dimethoxy ethane (DME) and diethoxy ethane (DEE); γ-butyrolactone (GSL); acetonitrile (AN); and sulfolane (SL), or a mixed solvent thereof can be cited.

As the polymeric material, for example, polyvinylidene difluoride (PVdF), polyacrylonitrile (PAN) and polyethylene oxide (PEO) can be cited.

The ordinary-temperature-molten salt (ionic melt) refers to, among organic salts formed by combining organic cations and anions, compounds that can exist as a liquid at ordinary temperature (15° C. to 25° C.).

As the ordinary-temperature-molten salt, ordinary-temperature-molten salt that exists as a liquid alone, ordinary-temperature-molten salt that is changed to a liquid by being mixed with an electrolyte, and ordinary-temperature-molten salt that is changed to a liquid by being dissolved in an organic solvent can be cited. Incidentally, the melting point of ordinary-temperature-molten salt used for a non-aqueous electrolyte battery is generally 25° C. or less. And, the organic cation generally has a quaternary ammonium framework.

The polymeric solid electrolyte is prepared by dissolving an electrolyte in a polymeric material and solidifying the electrolyte.

2) Negative Electrode Active Material Layer 5

The negative electrode active material layer 5 includes a negative electrode current collector and a negative electrode material layer (negative electrode active material containing layer) carried on one side surface or each of both side surfaces of the negative electrode current collector and including a negative electrode active material, a conductive agent, and if necessary, a binder, etc. The conductive agent is desirably compounded to improve a current collecting performance and to limit a contact resistance with the current collector. The negative electrode current connector preferably uses an aluminum foil from pure aluminum (purity: 100%) to an aluminum alloy of the purity of 98% or more. As the aluminum alloy, an alloy including, in addition to aluminum, at least one element selected from a group including iron, magnesium, zinc, manganese and silicon is preferable. For example, an Al—Fe alloy, an Al—Mn based alloy and an Al—Mg based alloy can obtain a higher strength than the pure aluminum. On the other hand, a content of transition metal such as nickel, chromium or the like in the aluminum alloy is preferably set to 100 ppm or less (including 0 ppm). If the current collector is formed by, for example, an Al—Cu based alloy, the Al—Cu based alloy increases a strength of the current collector but deteriorates a corrosion resistance thereof. Therefore, the Al—Cu based alloy is not good for the current collector.

A range of more desirable aluminum purity is in 99.95 to 98.0%. In the present embodiment, by using titanium containing oxide particles having an average particle size is 2 μm or more as secondary particles in an aluminum foil of the above described range of the aluminum purity, it is possible to reduce a negative electrode pressing pressure and to reduce an elongation of the aluminum foil. As a result of this, an electron conductivity of the aluminum foil of the current collector can advantageously be increased and further, a negative electrode of low resistance can be produced by suppressing shredding of the secondary particles of titanium containing oxide.

An average particle size (diameter) of the secondary particles of negative electrode active material is preferably larger than 5 μm. More desirably, the average particle size is 7 to 20 μm. In this range, a negative electrode of high density can be produced while maintaining a pressure of the negative electrode pressing in low and thus, the elongation of the current collector of aluminum foil can be suppressed.

The secondary particles of negative electrode active material having the average particle size which is larger than 5 μm can be obtained as follows. Raw materials of active material are firstly reacted to synthesize active material precursors as first particles having an average particle size which is 1 μm or less. Then, the active material precursors are calcined. The calcined active material precursors are broken by using a grinder such as a ball mill or a jet mill and are further calcined to aggregate the broken active material precursors with each other and to grow them to secondary particles of a large particle size. The average particle size of the first particles is preferably 1 μm or less. AS a result of this, a high-input performance (quick charge) is improved. This is because, for example, a diffusion length of lithium ions in the active material becomes shorter and a specific surface area thereof increases. Incidentally, it is more preferable that the average particle size is 0.1 to 0.8 μm. It is also preferable to coat the surface of the secondary particle with a carbon material to reduce a resistance of the negative electrode. This can be achieved by adding precursors of carbon material into the calcined active material precursors as the first particles in a secondary particle production process and by calcining them at 500° C. or higher in an inert atmosphere.

Also, in the negative material electrode layer after it is produced, the secondary particles and first particles of titanium containing oxide may be mixed. In order to achieve a high density of the negative material electrode layer, the first particles are preferably included in 5 to 50% by volume in the negative electrode material layer.

As negative electrode active material particles that occlude and emit lithium ions of the negative electrode active material, particles of carbon material, graphite material, lithium alloy material, metallic oxide and metallic sulfide can be cited. And, among others, it is preferable to select negative electrode active material particles of at least one kind of titanium containing oxide which is selected from lithium titanium oxide, titanium oxide, niobium titanium oxide and lithium-sodium-niobium-titanium oxide, and which has an electric potential of lithium ions for an occlusion/emission in a range of 1 to 3 V in a Li electric potential reference.

As lithium titanium oxide:lithium titanium oxide with a spinel structure that can be represented by the general formula $Li_{4+x}Ti_5O_{12}$ (x: $-1 \leq x \leq 3$); sodium containing orthorhombic titanium oxide that can be represented by the general formula $Li_{2+a}M(I)_{2-b}Ti_{6-c}M(II)_dO_{14+\sigma}$ ($0 \leq a \leq 6$, $0<b<2$, $0<c<6$, $0<d<6$, $-0.5 \leq \delta \leq 0.5$) (M(I)=Sr, Ba, Ca, Mg, Na, Cs, K, M(II)=Zr, Sn, V, Nb, Ta, Mo, W, Fe, Co, Mn, Al, Y); lithium titanium oxides with a ramsdellite structure such as $Li_{2+x}Ti_3O_7$, $Li_{1+x}Ti_2O_4$, $Li_{1.1+x}Ti_{1.8}O_4$, $Li_{1.07+x}Ti_{1.86}O_4$ and $Li_xTiO_2$ (x: $0 \leq x$); titanium oxides with a monoclinic structure (TiO$_2$(B) as a structure before charging) represented by the general formula $Li_xTiO_2$ ($0 \leq x$); and titanium oxides (TiO$_2$ as a structure before charging) with a rutile structure or with an anatase structure may be cited. Niobium titanium oxide is represented by $LiaTiMbNb_{2+\beta}O_{7\pm\sigma}$ ($0<a<5$, $0<b<0.3$, $0<\beta<0.3$, $0<\sigma<0.3$, M is at least one element selected from Fe, V, Mo and Ta). And, these oxides may be used alone or in a mixed state. More desirable is lithium titanium oxide with a spinel structure that changes very little in volume and can be represented by the general formula $Li_{4+x}Ti_5O_{12}$ (x: $-1 \leq x \leq 3$). By using these titanium containing oxides, an aluminum foil which is the same as that of the positive electrode current collector, instead of a conventional copper foil, can be used for the negative electrode current collector so that a weight reduction and lower costs of the negative electrode current collector can be achieved to bring advantageous to the electrode structure of a bipolar structure.

The reason why the average particle size of the negative electrode active material is set to the above range is as follows. If the specific surface area of the negative electrode is increased to 3 to 50 $m^2/g$ by using first particles whose average particle size exceeds 1 μm, a fall in a porosity of the negative electrode becomes unavoidable. However, if the average particle size becomes smaller, the particles are more likely to aggregate and a distribution of non-aqueous electrolyte may be concentrated in the negative electrode so that a depletion of the electrolyte in the positive electrode may be caused. Therefore, it is desirable to set a lower limit of the average particle size of the first particles to 0.001 μm.

The negative electrode active material desirably has the average particle size of 1 μm or less and the specific surface area by the BET method using $N_2$ adsorption in a range of 3 to 200 $m^2/g$. This cause an affinity of the negative electrode with the non-aqueous electrolyte can further be increased.

The reason why the specific surface area of the negative electrode is specified in the above range will be described. If the specific surface area is less than 3 $m^2/g$, an aggregation of particles becomes conspicuous, an affinity of the negative electrode with a non-aqueous electrolyte decreases and an interfacial resistance of the negative electrode increases. Thus, an output characteristic and charge and discharge cycle characteristic of the negative electrode deteriorate. If the specific surface area exceeds 50 $m^2/g$, on the other hand, a distribution of the non-aqueous electrolyte is concentrated in the negative electrode and the shortage of the negative electrode in the positive electrode is invited and thus, output characteristics and charge and a depletion of the electrolyte in the positive electrode is caused. Thus, the output characteristic and charge and discharge cycle characteristic of the negative electrode cannot be improved. A more desirable range of the specific surface area is 5 to 50 $m^2/g$. Here, the specific surface area of the negative electrode means a surface area thereof per one gram of the negative electrode layer (excluding the current collector weight). Incidentally, the negative electrode layer is a porous layer including the negative electrode active material, conductive agent and binder, each of which is carried on the current collector.

The porosity of the negative electrode (excluding the current collector) is desirably set in a range of 20 to 50%. Accordingly, a high-density negative electrode which is superior in the affinity with the non-aqueous electrolyte can be obtained. A more desirable range of the porosity is 25 to 40%.

The negative electrode current collector is desirably made of aluminum foil or aluminum alloy foil.

A thickness of the aluminum foil or aluminum alloy foil is desirably 20 μm or less and more desirably 15 μm or less. A purity of the aluminum foil is desirably 99.99% or more. The aluminum alloy desirably contains at least one element such as magnesium, zinc, silicon or the like. On the other hand, a content of transition metal such as iron, copper, nickel, chromium or the like is desirably set to 100 ppm or less.

As the conductive agent, for example, a carbon material can be used. As the carbon material, for example, acetylene black, carbon black, coke, carbon fiber, graphite, aluminum powder, TiO or the like can be cited. Coke, graphite, powder of TiO, each being processed with a heat-treatment temperature from 800° C. to 2000° C. and having an average particle size of 10 μm or less, or carbon fiber having an average fiber diameter of 1 μm or less is more desirable for the carbon material. A specific surface area of the carbon material by using $N_2$ adsorption is desirably 10 $m^2/g$ or more.

As the binder, for example, polytetrafluoroethylene (PTFE), polyvinylidene difluoride (PVdF), fluororubber, styrene-butadiene rubber, core shell binder and the like can be cited.

A compounding ratio of the active material, the conductive agent and the binder in the negative electrode is desirably such that negative electrode is in a range of 80 to 95% by weight, the conductive agent is in a range of 3 to 18% by weight and the binder is in a range of 2 to 7% by weight.

The negative electrode is formed by suspending the above described negative electrode material, conductive agent and binder in an appropriate solvent, by coating a current collector with the suspension, by drying the suspension and by being subjected with a warming press. And in this case, particles of the negative electrode active material are uniformly dispersed while a loading amount of the binder is small. If the loading amount of the binder is large, a dispersibility of the particles tends to increase. However, a surface of each particle is more likely to be covered with the binder and the specific surface area of the negative electrode is made to be small. If the loading amount of the binder is small, the particles are more likely to aggregate with each other. However, fine particles can uniformly be dispersed by adjusting stirring conditions (the number of revolutions of a ball mill, a stirring time and a stirring temperature) to suppress an aggregation of the particles, so that the negative electrode of the present invention can be obtained. Further, if the loading amount of the conductive agent is large while the loading amount of the binder and the stirring conditions are within proper ranges, the surface of the negative electrode active material is likely to be coated with the conductive agent and also pores in the surface of the negative electrode tend to decrease. Thus, the specific surface area of the negative electrode tends to be small. If the loading amount of the conductive agent is small while the loading amount of the binder and the stirring conditions are within proper ranges, the negative electrode active material is likely to be ground so that the specific surface area of the negative electrode tends to increase, or the dispersibility of the negative electrode active material falls so that the specific surface area of the negative electrode tends to decrease. Further, in addition to the loading amount of the conductive agent, the average particle size and specific surface area of the conductive agent can affect the specific surface area of the negative electrode. And, it is preferable that the average particle size of the conductive agent is smaller than the average particle size of the negative electrode active material and the specific surface area of the conductive agent is larger than the specific surface area of the negative electrode active material.

3) Positive Electrode Active Material Layer 4

The positive electrode active material layer 4 includes a current collector and a positive electrode material layer (positive electrode active material containing layer) carried on one side surface or each of both side surfaces of the current collector and including a positive electrode active material and a binder.

The positive electrode active material includes oxides, sulfides and the like. As the positive electrode active material, for example: manganese dioxide ($MnO_2$), iron oxide, copper oxide and nickel oxide, each occluding lithium therein; lithium-manganese composite oxide (for example, $Li_xMn_2O_4$ or $Li_xMnO_2$); lithium-nickel composite oxide (for example, $Li_xNiO_2$); lithium-cobalt composite oxide (for example, $Li_xCoO_2$); lithium-nickel-cobalt composite oxide (for example, $LiNi_{1-y}Co_yO_2$); lithium-manganese-cobalt composite oxide (for example, $Li_xMn_yCo_{1-y}O_2$); spinel type lithium-manganese-nickel composite oxide (for example, $Li_xMn_{2-y}Ni_yO_4$); lithium-phosphorus composite oxide having an olivine structure (such as $Li_xFePO_4$, $Li_xFe_{1-y}Mn_yPO_4$, $Li_xCoPO_4$ and the like); iron sulfate (for example, $Fe_2(SO_4)_3$); vanadium oxide (for example, $V_2O_5$) and the like can be cited. Herein, each of x and y is in a range of 0 to 1.

As the positive electrode active material from which a high positive electrode voltage can be obtained, lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($LiNi_{1-y}Co_yO_2$), spinel type lithium-manganese-nickel composite oxide ($Li_xMn_{2-y}Ni_yO_4$), lithium-manganese-cobalt composite oxide ($Li_xMn_yCo_{1-y}O_2$), lithium-iron phosphate ($Li_xFePO_4$), lithium-nickel-cobalt-manganese composite oxide and the like can be cited. Herein, each of x and y is in a range of 0 to 1.

When ordinary-temperature-molten salt is used, lithium-iron phosphate, $Li_xVPO_4F$, lithium-manganese composite oxide, lithium-nickel composite oxide, or lithium-nickel-cobalt composite oxide is preferably used from a viewpoint of cycle life. If such an ordinary-temperature-molten salt as described above is used, a reactivity between the positive electrode active material and the ordinary-temperature-molten salt is reduced. A first particle size of the positive electrode active material is preferably 100 nm or more and 1 μm or less. A positive electrode active material having the first particle size being 100 nm or more is easy to be handled in an industrial production. A positive electrode active material having the first particle size being 1 μm or less can smoothly promote a diffusion of lithium ions in solid.

A specific surface area of the positive electrode active material is preferably 0.1 $m^2/g$ or more and 10 $m^2/g$ or less. The positive electrode active material having the specific surface area of 0.1 $m^2/g$ or more can adequately secure occlusion/emission sites for lithium ions. The positive electrode active material having the specific surface area of 10 $m^2/g$ or less is easy to be handled in the industrial production and also can ensure a good charge and discharge cycle performance.

As the binder intended to bind the positive electrode active material with the current collector, for example, polytetrafluoroethylene (PTFE), polyvinylidene difluoride (PVdF), fluororubber and the like can be cited.

A conductive agent can be compounded if necessary to enhance a current collecting performance and to suppress a contact resistance with the current collector. As the conductive agent, for example, a carbon material such as acetylene black, carbon black, graphite and the like can be cited.

As a compounding ratio between the positive electrode active material and the binder, it is preferable that the positive electrode active material is in a range of 80% by weight or more to 98% by weight or less and the binder is in a range of 2% by weight or more to 20% by weight or less. When the amount of binder is 2% by weight or more, sufficient electrode strength can be obtained. When the amount of binder is 20% by weight or less, a compounding amount of insulator in the electrode can be reduced and an internal resistance in the electrode can be reduced.

When a conductive agent is added, a loading effect of the conductive agent can be obtained by setting a loading amount thereof to 3% by weight or more. And, a decomposition of a non-aqueous electrolyte on a surface of the positive electrode conductive agent under high-temperature conditions can be reduced by setting the loading amount thereof to 15% by weight or less.

The positive electrode may include a solid electrolyte which is different from the solid electrolyte used in the first embodiment. The positive electrode is formed, for example, by suspending a positive electrode active material, a powder of solid electrolyte and a binder and conductive agent compounded if necessary in an appropriate solvent to produce a slurry thereof, by coating a positive electrode current collector with the slurry, by drying the slurry to form a positive electrode material layer and finally by pressing the dried positive electrode material layer.

Alternatively, the positive electrode material layer may be prepared by mixing the positive electrode active material, the powder of solid electrolyte and the binder and conductive agent compounded if necessary, by forming pellets with the mixture and by obtaining a powder compact based on the pellets.

The positive electrode current collector is desirably made of an aluminum foil or an aluminum alloy foil. A thickness of the aluminum foil or aluminum alloy foil is desirably 0.1 μm or more and 20 μm or less, and more desirably 15 μm or less. A purity of the aluminum foil is desirably 99% by weight or more. The aluminum alloy desirably contains at least one element such as magnesium, zinc, silicon or the like. A content of a transition metal such as iron, copper, nickel, chromium or the like, contained in the aluminum foil or aluminum alloy foil is preferably set to 1% by weight or less. In a total solid battery using a solid electrolyte, a current collector is desirably formed by deposition or sputtering of metal.

The positive electrode may include a non-aqueous electrolyte, a polymer (polymeric material) electrolyte, or an ordinary-temperature-molten salt material to reduce a contact area.

4) Container Member 61

When the non-aqueous electrolyte, together with the solid electrolyte, is used, a laminated film having a thickness of 0.5 mm or less or a metal container having a thickness of 1.0 mm or less is used as the container member 61. The thickness of the metal container is desirable 0.5 mm or less. Further, for a total solid battery constructed by the solid electrolyte, a molded product is preferably used as the container member.

As a shape of the container member 61, a flat shape (thin shape), a square shape, a cylindrical shape, a coin shape, a button shape and the like can be cited. As the container member 61, for example, a container member for a small battery mounted in a mobile electronic device or the like and a container member for a large battery mounted in a two-wheeled or four-wheeled vehicle can be cited.

As the laminated film, a multilayered film in which a metal layer is interposed between resin films is used. The metal layer is preferably an aluminum foil or an aluminum alloy foil to reduce a weight thereof. As the resin film, for example, a polymeric material such as polypropylene (PP), polyethylene (PE), nylon or polyethylene terephthalate (PET) can be used. The laminated film can be formed into a shape of a container member by performing a heat sealing.

The metal container is formed of the aluminum, the aluminum alloys or the like. The aluminum alloy containing at least one element such as magnesium, zinc, silicon or the like is desirable. A content of a transition metal such as iron, copper, nickel, chromium or the like contained in the aluminum foil or aluminum alloy foil is preferably set to 100 ppm or less.

The molded product includes a resin molded product formed of cresol-novolak epoxy resin (ECN), biphenyl epoxy resin and molten silica fillers. In addition, a multi-functional mold resin in which a high glass transition temperature is achieved in a high crosslink density and a lead-free and/or halogen-free mold resin based on a biphenyl or high functional polymer can be used. On the other hand, for a solid battery of a large-scale and large-capacity, a molded product of a ceramic glass can be used in consideration of an influence of a heat generation and the like. Any molded product which is superior in an electric insulating and heat insulating properties and which is used mainly in a field of semiconductor can be used.

Figure 6:
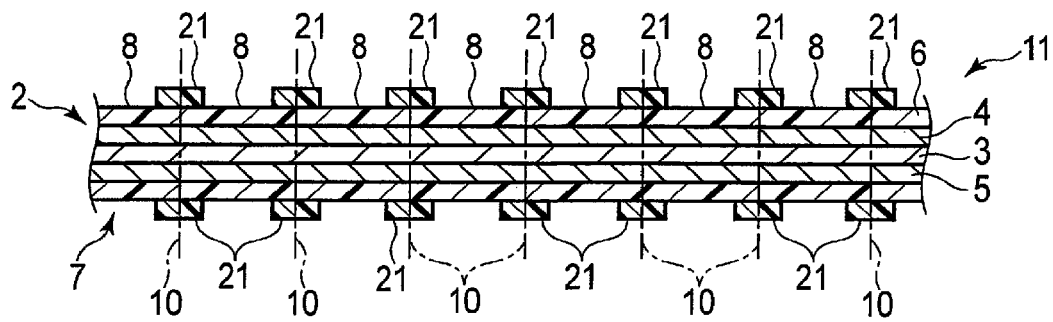
FIG. 6 is a sectional view schematically showing a bipolar electrode according to a second embodiment in a plate-like state before it is folded.

FIG. 6 is a sectional view schematically showing a bipolar electrode for a non-aqueous electrolyte battery, according to a second embodiment in a plate-like state before it is folded. In FIG. 6, the same reference numerals denote the same components as those in FIGS. 1 to 5 and duplicate descriptions thereof are omitted.

In the bipolar electrode 11 of the present embodiment, a method for forming the thickness increased portion 13 formed on the part of the insulating layer 6 located on the bent portion 12 is changed as described below. In the present embodiment, the thickness increased portion 13 is formed by affixing an insulating tape 21 to an outer surface of the part of the insulating layer 6 located on the bent portion 12.

Also in the present embodiment, like in the first embodiment, if the electrode body 2 and/or the insulating layer 6 are or is cracked at the bent portion 12 while the zigzag patterned folding member 9 of the bipolar electrode 11 is formed, the positive electrode active material layer 4 and the negative electrode active material layer 5 can be prevented from coming into contact with each other by the thickness increased portion 13. Accordingly, even the non-aqueous electrolyte battery 60 having the zigzag patterned folding portion 9 can prevent an internal short-circuit from occurring in the bent portion 12 of the zigzag patterned folding portion 9 so that an improvement of an energy density can be achieved.

Figure 7:
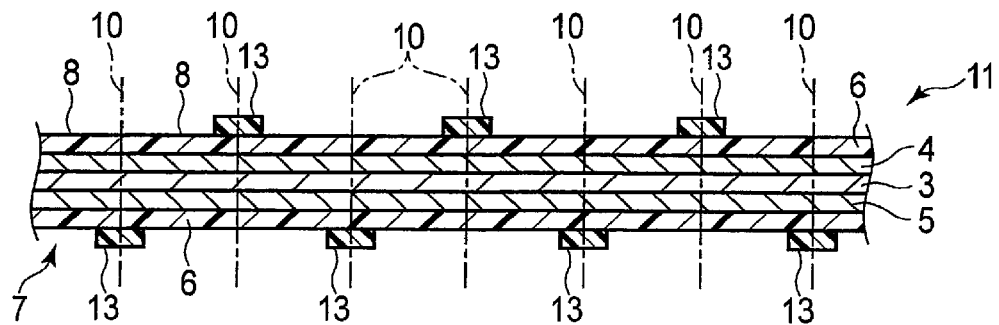
FIG. 7 is a sectional view schematically showing a bipolar electrode according to a third embodiment in a plate-like state before it is folded.

FIG. 7 shows a third embodiment. In FIG. 7, the same reference numerals denote the same components as those in FIGS. 1 to 5 and duplicate descriptions thereof are omitted.

In the bipolar electrode 11 according to the present embodiment, the thickness increased portion 13 is provided on a part of the insulating layer 6. The part is to be located on an outermost part of the bent portion 12 of the zigzag patterned folding portion 9 after the plate-like member 7 of the bipolar electrode 11 is folded to be transformed to the zigzag patterned folding portion 9. Thus, in the present embodiment, the thickness increased portion 13 is not provided on the other part of the insulating layer 6. The other part is to be located on an innermost part of the bent portion 12 of the zigzag patterned folding portion 9 after the plate-like member 7 of the bipolar electrode 11 is folded to be transformed to the zigzag patterned folding portion 9. Accordingly, in the present embodiment, as shown in FIG. 7, the thickness increased portions 13 are provided on one of the insulating layers 6 of the electrode body 2 and on the other of the insulating layers 6 at positions corresponding to the reference lines 10 of the plate-like member 7 alternately.

Also in the present embodiment, like in the first embodiment, if the electrode body 2 and/or the insulating layer 6 are or is cracked at the bent portion 12 while the zigzag patterned folding member 9 of the bipolar electrode 11 is formed, the positive electrode active material layer 4 and the negative electrode active material layer 5 can be prevented from coming into contact with each other by the thickness increased portion 13.

Figure 8:
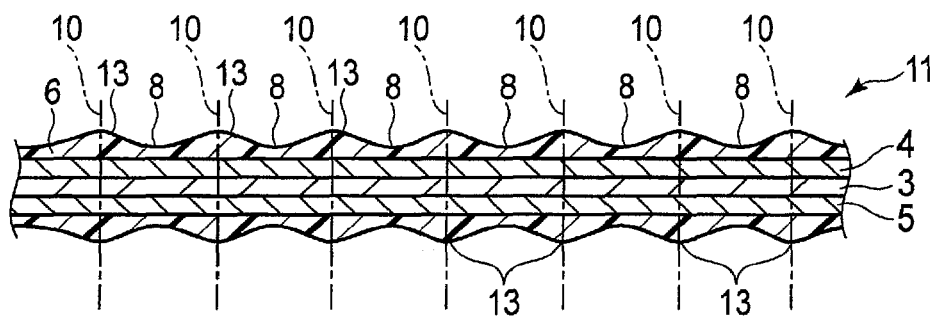
FIG. 8 is a sectional view schematically showing a bipolar electrode according to a fourth embodiment in a plate-like state before it is folded.

FIG. 8 shows a fourth embodiment. In FIG. 8, the same reference numerals denote the same components as those in FIGS. 1 to 5 and duplicate descriptions thereof are omitted.

In the bipolar electrode 11 of the present embodiment, a method for forming the thickness increased portion 13 on the part of the insulating layer 6 located on the bent portion 12 is changed as described below. In the present embodiment, a coating speed of an insulating material for the insulating layer 6 is changed for one parts and the other parts on each of the positive electrode active material layer 4 and negative electrode active material layer 5 of the plate-like electrode body 2, the one parts corresponding to the flat portions 8 and the other parts corresponding to the bent portions 12 after the plate-like member 7 of the bipolar electrode 11 is folded to be transformed to the zigzag patterned folding portion 9. Particularly, the coating speed of the insulating material is maintained at a constant speed when the insulating material is coated on each of the one parts corresponding to the flat portions 8, and the coating speed of the insulating material is lowered to the constant speed when the insulating material is coated on each of the other parts corresponding to the bent portions 8. Therefore, the thickness increased portion 13 can be integrally formed with a part of the insulating layer 6 located on the bent portion 12.

Also in the present embodiment, like in the first embodiment, if the electrode body 2 and/or the insulating layer 6 are or is cracked at the bent portion 12 while the zigzag patterned folding member 9 of the bipolar electrode 11 is formed, the positive electrode active material layer 4 and the negative electrode active material layer 5 can be prevented from coming into contact with each other by the thickness increased portion 13.

Further in the present embodiment, the thickness increased portion 13 can be integrally formed with the insulating layer 6 at the part of the insulating layer 6 to be located on the bent portion 12 by changing an extrusion speed of a liquid insulating material or a coating speed thereof while the insulating material is coated on each of the positive electrode active material layer 4 and negative electrode active material layer 5 of the electrode body 2. Therefore, a work for forming the thickness increased portion 13 on the insulating layer 6 can be simplified.

Figure 9:
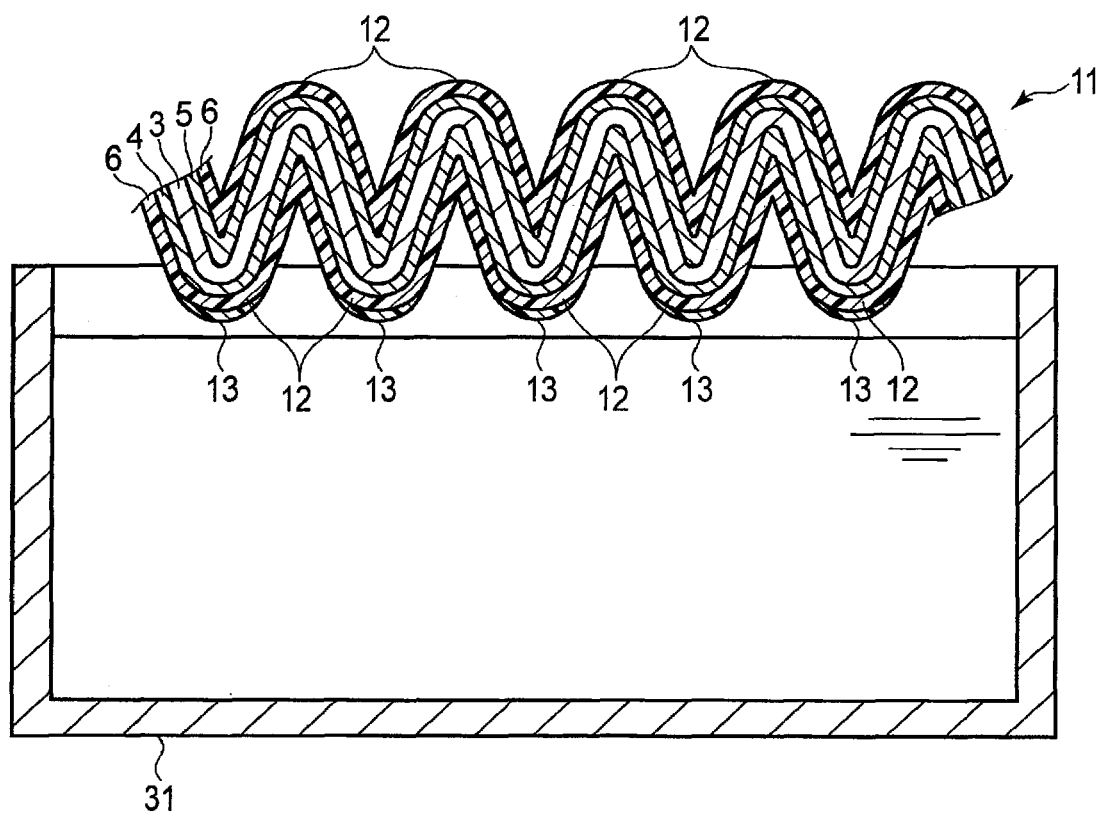
FIG. 9 is a sectional view schematically showing a process of forming a thick film portion of an electrically insulating material including a non-aqueous electrolyte on an outer surface of a plurality of bent portions of a bipolar electrode according to a fifth embodiment.

FIG. 9 shows a fifth embodiment. In FIG. 9, the same reference numerals denote the same components as those in FIGS. 1 to 5 and duplicate descriptions thereof are omitted.

In the bipolar electrode 11 of the present embodiment, a method for forming the thickness increased portion 13 on the part of the insulating layer 6 located on the bent portion 12 is changed as described below. In the present embodiment, the bent portions 12 of the zigzag patterned folding member 9 are dipped in a melted insulating material held in a container 31 to attach the melted insulating material on the bent portions 12 of the zigzag patterned folding member 9. After that, the melted insulating material on the bent portions 12 is dried so that the thickness increased portion 13 of the insulating layer 6 is formed on the bent portions 12.

Also in the present embodiment, like in the first embodiment, if the electrode body 2 and/or the insulating layer 6 are or is cracked at the bent portion 12 while the zigzag patterned folding member 9 of the bipolar electrode 11 is formed, the positive electrode active material layer 4 and the negative electrode active material layer 5 can be prevented from coming into contact with each other by the thickness increased portion 13.

Next, self-discharge tests were carried out using Examples 1 to 9 and Comparative Examples 1 to 3 structured as described below, in order to check an effect of the bipolar electrode 11 of one embodiment structured as described above.

Example 1

The electrode body 2 of the bipolar electrode 11 includes the current collector 3, the positive electrode active material layer 4 formed on one side surface of the current collector 3 and the negative electrode active material layer 5 formed on the other side surface of the current collector 3. Aluminum is used as a raw material of the current collector 3, and the current collector 3 is formed in a square shape whose one side has a length of, for example, 45 cm. Lithium-manganese phosphate (hereinafter, LMP) is used for the positive electrode active material layer 4, and lithium titanate (hereinafter, LTO) is used for the negative electrode active material layer 5. The positive electrode active material layer 4 can occlude and emit lithium. In the negative electrode active material layer 5, a reaction potential resides near 1.5 V. LMP or LTO and 5 wt. % of carbon as a conductive assistant with respect to a total weight of the electrode body 2 and 10 wt. % of polyvinylidene difluoride as a binder with respect to a total weight of the electrode body 2 are mixed. And, the rectangular shaped plate-like member 7 for the bipolar electrode 11 is produced by molding the mixture on the one side surface or other side surface of the current collector 3. Then, the plate-like member 7 for the bipolar electrode 11 is folded in a zigzag pattern to obtain the zigzag patterned bipolar electrode 11 according to Example 1. In this procedure, the plate-like member 7 is divided into a plurality of portions of a predetermined length in one direction, and portions between the divided flat portions 8 are successively bent to orient alternatively in opposite direction to each other so that the folding shaped portion 9 with a zigzag pattern as shown in FIG. 2 is formed. Each of the flat portions 8 of the bipolar electrode 11 has, for example, a length of 5 cm. The insulating layers 6 are formed on the bipolar electrode 11 by dispersing $Li_7La_3Zr_2O_{12}$ (hereinafter, LLZ) in a PVdF binder solution in which PVdF binders are dissolved in an n-methylpyrrolidone (NMP), by coating each of the positive electrode active material layer 4 and negative electrode active material layer 5 with the dispersed PVdF binder solution using a gravure coater, and by drying the dispersed and coated PVdF binder solution. With the above described process, the insulating layer 6 having a thickness of 3 μm was formed. Further, the thickness increased portions 13 were formed on the bipolar electrode 11 by pattern coating of the dispersed PVdF binder solution at every 5 cm to make each having a thickness of 4 μm which is thicker about 1.3 times than the thickness of the insulating layer 6 on the flat portion 8, as shown in FIG. 4.

Example 2

The insulating layer 6 was formed on each of the positive electrode active material layer 4 and negative electrode active material layer 5 of the bipolar electrode 11, and further the thickness increased portions 13 were clearly and intermittently provided on each of the positive electrode active material layer 4 and negative electrode active material layer 5 at every 5 cm to make the insulating layer 6 in each thickness increased portion 13 being thicker 1.3 times than the thickness of the insulating layer 6 on the flat portion 8, as shown in FIG. 5. Otherwise, the bipolar electrode of the example 2 was formed by the same forming processes as those for the bipolar electrode 11 described in the Example 1.

Example 3

The insulating layer 6 is formed on each of the positive electrode active material layer 4 and negative electrode active material layer 5 of the bipolar electrode 11, and further the thickness increased portions 13 were provided on each of the positive electrode active material layer 4 and negative electrode active material layer 5 at every 10 cm to make the insulating layer 6 in each thickness increased portion 13 being thicker 1.3 times than the thickness of the insulating layer 6 on the flat portion 8. In this example, the position of each of the thickness increased portions 13 on the positive electrode active material layer 4 is shifted for a half of each of intervals of the positions of the thickness increased portions 13 on the negative electrode active material layer 5 from the position of each of the thickness increased portions 13 on the positive electrode active material layer 4 in an extending direction of the bipolar electrode 11, as shown in FIG. 7. Otherwise, the bipolar electrode of the example 3 was formed by the same forming processes as those for the bipolar electrode 11 described in the Example 1.

Example 4

The insulating layer 6 was formed on each of the positive electrode active material layer 4 and negative electrode active material layer 5 of the bipolar electrode 11 by coating each of the positive electrode active material layer 4 and negative electrode active material layer 5 of the bipolar electrode 11 with a dispersion fluid in which LLZ is dispersed through a die-head coater. And, in this forming process, an extrusion speed and/or coating speed of the dispersion fluid is changed to provide the thickness increased portions 13 on each of the positive electrode active material layer 4 and negative electrode active material layer 5 at every 5 cm and to make the insulating layer 6 in each thickness increased portion 13 being thicker 1.3 times than the thickness of the insulating layer 6 on the flat portion 8. Otherwise, the bipolar electrode of the example 4 was formed by the same forming processes as those for the bipolar electrode 11 described in the Example 1.

Example 5

The thickness increased portions 13 of the insulating layer 6 were formed on the bent portions 12 of the bipolar electrode 11 at every 5 cm described in the Example 1 by dipping the bent portions 12 of the bipolar electrode 11 in the dispersion fluid in which LLZ is dispersed to make the insulating layer 6 in each thickness increased portion 13 being thicker 1.2 times than the thickness of the insulating layer 6 on the flat portion 8. Otherwise, the bipolar electrode of the example 5 was formed by the same forming processes as those for the bipolar electrode 11 described in the Example 1.

Example 6

Adhesive tapes each having an electric insulation performance were attached at every 5 cm to each of the insulating layers 6 of the bipolar electrode 11 described in the Example 1, as shown in FIG. 6. Otherwise, the bipolar electrode of the example 6 was formed by the same forming processes as those for the bipolar electrode 11 described in the Example 1.

Example 7

Each of the insulating layers 6 of the bipolar electrode 11 described in the Example 1 was formed by using $Al_2O_3$. Otherwise, the bipolar electrode of the example 7 was formed by the same forming processes as those for the bipolar electrode 11 described in the Example 1.

Example 8

The negative electrode active material layer 5 was formed by using niobium-titanium oxide (NbTO). Otherwise, the bipolar electrode of the example 8 was formed by the same forming processes as those for the bipolar electrode 11 described in the Example 1.

Example 9

The negative electrode active material layer 5 was formed by using sodium containing orthorhombic titanium oxide (NaTO). Otherwise, the bipolar electrode of the example 9 was formed by the same processes as those for the bipolar electrode 11 described in the Example 1.

Comparative Example 1

The insulating layer 6 of 3 μm in its thickness was formed by coating the positive electrode active material layer 4 with the dispersion fluid in which LLZ is dispersed by using a gravure coater and by drying the coated dispersion fluid to form a bipolar electrode.

Comparative Example 2

A bipolar electrode of the comparative Example 2 was formed by the same forming processes as those described in the comparative Example 1, excepting that NbTO was used for the negative electrode active material layer 5.

Comparative Example 3

A bipolar electrode of the comparative Example 3 was formed by the same forming processes as those described in the comparative Example 1, excepting that NaTO was used for the negative electrode active material layer 5.

In the self-discharge tests, a battery having a capacity of 1 Ah is formed by a laminated cell including a positive electrode and a negative electrode. The battery is fully charged and then stored for one to six months in a constant temperature oven set to 60° C. And, a discharge capacity remaining in the battery is checked at predetermined periods. When checking is done, a discharge test is carried out after waiting until a temperature inside the battery falls to the room temperature of 25° C. The remaining capacity after the predetermined period have passed is denoted as a percentage while an initial discharge capacity is set as 100%.

Results of the self-discharge test are listed on Table 1. In embodiments described below, a thickness measurement of the insulating layer is performed by cutting the insulating layer with an FIB device (focused ion beam device) and by observing a cross section of a composite electrolyte with a magnification of 2,000 times through a scanning electron microscope (SEM).

TABLE 1

|  | 25° C. 1 month passed | 25° C. 3 months passed | 25° C. 6 months passed | 60° C. 1 month passed | 60° C. 6 months passed |
| --- | --- | --- | --- | --- | --- |
| Example 1 (+: LMP, −: LTO) | 99.2 | 98.8 | 98.1 | 95.1 | 92.6 |
| Example 2 (+: LMP, −: LTO) | 99.5 | 98.9 | 98.0 | 95.0 | 92.1 |
| Example 3 (+: LMP, −: LTO) | 99.0 | 98.7 | 97.9 | 94.9 | 93.7 |
| Example 4 (+: LMP, −: LTO) | 99.6 | 98.8 | 98.2 | 95.3 | 92.5 |
| Example 5 (+: LMP, −: LTO) | 98.2 | 97.7 | 96.5 | 93.5 | 90.8 |
| Example 6 (+: LMP, −: LTO) | 99.6 | 98.5 | 98.2 | 95.3 | 92.5 |
| Example 7 (+: LMP, −: LTO) | 99.0 | 98.7 | 97.9 | 94.9 | 93.0 |
| Example 8 (+: LMP, −: NbTO) | 99.6 | 98.8 | 98.2 | 95.3 | 92.5 |
| Example 9 (+: LMP, −: NaTO) | 98.1 | 97.7 | 96.7 | 93.5 | 90.8 |
| Comparative example 1 (+: LMP, −: LTO) | 95.2 | 91.2 | 84.8 | 90.1 | 76.3 |
| Comparative example 2 (+: LMP, −: NbTO) | 95.5 | 91.0 | 82.8 | 88.6 | 72.3 |
| Comparative example 3 (+: LMP, −: NaTO) | 94.9 | 92.2 | 82.0 | 89.6 | 71.4 |

According to these embodiments, an internal short-circuit of a bipolar battery can be prevented, and a non-aqueous electrolyte battery being capable to realize an improvements of energy density, a manufacturing method thereof and a battery pack including a plurality of the non-aqueous electrolyte batteries can be provided.

Figure 10:
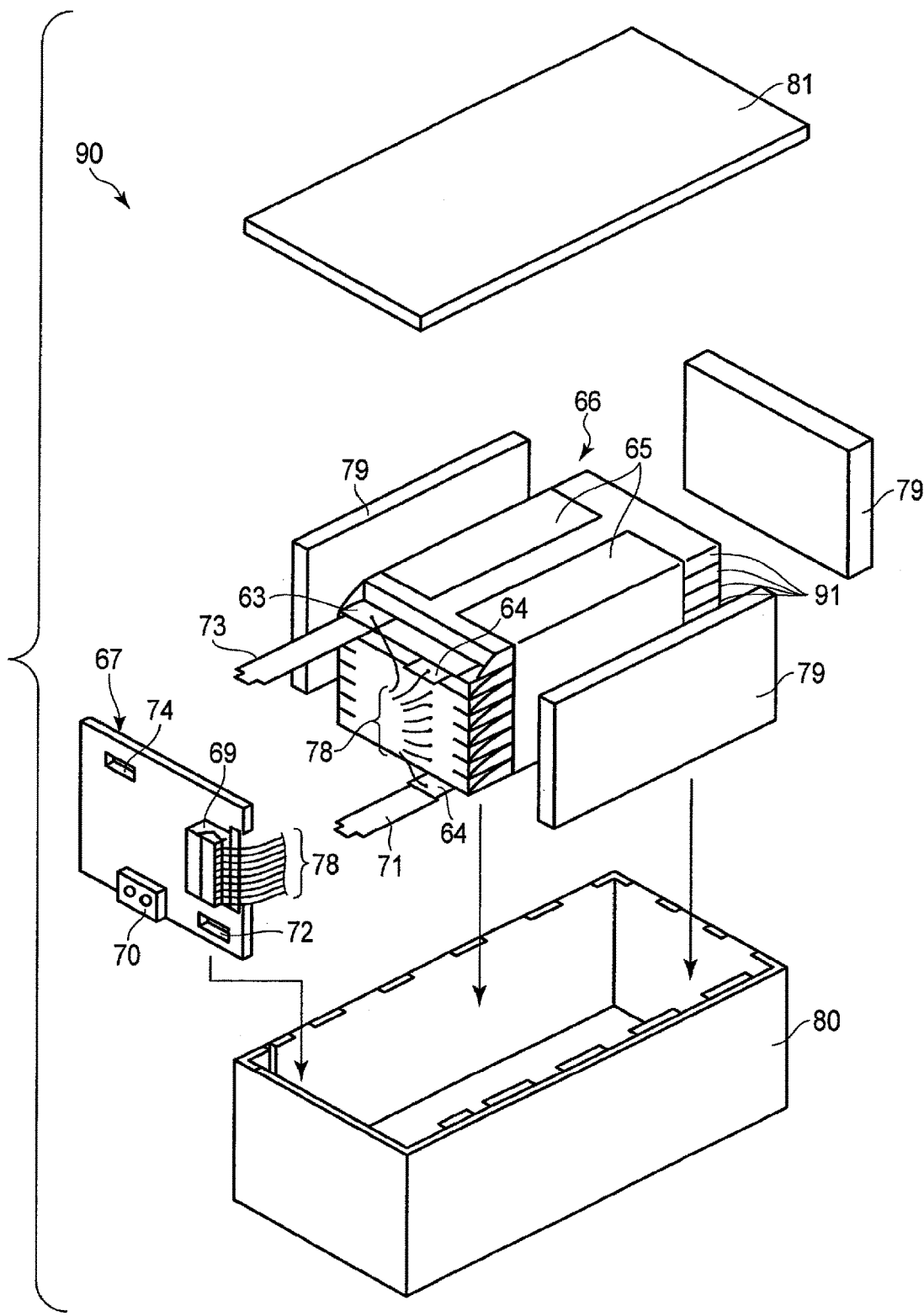
FIG. 10 is an exploded perspective view schematically showing a structure of a battery pack in which plural non-aqueous electrolyte batteries, each using the bipolar electrode and each according to the first embodiment in FIG. 1, are bundled.

FIG. 10 is an exploded perspective view schematically showing a structure of a battery pack 90 of the non-aqueous electrolyte batteries 60 each according to the first embodiment. FIG. 11 is a block diagram showing an electric circuit of the battery pack 90 in FIG. 10. The battery pack 90 shown in FIGS. 10 and 11 includes a plurality of unit cells 91. Each unit cell 91 is the non-aqueous electrolyte battery 60 described with reference to FIG. 1.

The battery pack according to this embodiment can further be provided with a protective circuit. The protective circuit is used to control a charge and discharge of the non-aqueous electrolyte batteries. Alternatively, a circuit contained in a device (for example, an electronic device, an automobile and the like) using the battery pack as a power supply can also be used as the protective circuit of the battery pack.

Also, the battery pack according to the embodiment can further be provided with external terminals for electrifying. The external terminals for electrifying are used to output a current from the non-aqueous electrolyte batteries to an outside thereof and also to input a current from the outside thereof into the non-aqueous electrolyte batteries. In other words, when the battery pack is used as the power supply, a current from the non-aqueous electrolyte batteries is supplied to the outside through the external terminals for electrifying. When the battery pack is charged, a current for charging (including regenerative energy from a power of an automobile) is supplied to the battery pack through the external terminals for electrifying.

The plurality of unit cells 91 are stacked such that negative electrode terminals 63 and positive electrode terminals 64 extending to the outside are aligned in the same direction, and are fastened with each other by an adhesive tape 65 to constitute a battery module 66. As shown in FIG. 11, these unit cells 91 are electrically connected to each other in series.

A printed wiring board 67 is arranged to oppose to side surfaces of the unit cells 91 from which the negative electrode terminals 63 and positive electrode terminals 64 of the unit cells 91 extend. As shown in FIG. 11, a thermistor 68, a protective circuit 69 and a terminal 70 for electrifying to external devices are mounted on the printed wiring board 67. An electrical insulating plate (not shown) for avoiding unnecessary connection to wires of the battery module 66 is mounted on a surface of the printed wiring board 67 opposing to the battery module 66.

A positive electrode lead 71 is connected to the positive electrode terminal 64 positioned in one of the both outer sided unit cells 91 of the battery module 66, and the tip end thereof is inserted into a positive electrode connector 72 of the printed wiring board 67 and is electrically connected thereto.

A negative electrode lead 73 is connected to the negative electrode terminal 63 positioned in the other of the both outer sided unit cells 91 of the battery module 66, and the tip end thereof is inserted into a negative electrode connector 74 of the printed wiring board 67 and is electrically connected thereto. These connectors 72 and 74 are connected to the protective circuit 69 through wires 75 and 76 formed on the printed wiring board 67.

The thermistor 68 detects a temperature of each unit cell 91 and a detection signal corresponding to the temperature is sent to the protective circuit 69. The protective circuit 69 is used to control a charge and discharge of the unit cell 91. The protective circuit 69 can cut off a positive-side wire 77a and negative-side wire 77b between the protective circuit 69 and the terminal 70 for electrifying to external devices under predetermined conditions. One of the predetermined conditions is, for example, when the temperature detected by the thermistor 68 is equal to or higher than a predetermined temperature. The other of the predetermined conditions is when an over-charge, an over-discharge, an over-current or the like of the unit cell 91 is detected. The detection of an over-charge or the like is carried out for each of the unit cells 91 or the whole of the battery module 66.

For the detection of each of the unit cells 91, a battery voltage, a positive electrode potential or a negative electrode potential may be detected. When the positive electrode potential or the negative electrode potential is detected, a lithium electrode used as a reference electrode is inserted into each of the unit cells 91. In the battery pack 90 shown in FIGS. 10 and 11, a wire 78 for voltage detection is connected to each of the unit cells 91. A detection signal is sent to the protective circuit 69 through these wires 78.

A protective sheet 79 made of rubber or resin is arranged on each of three side surfaces of the battery module 66 excluding one side surface from which the negative electrode terminal 63 and the positive electrode terminal 64 protrude.

The battery module 66 together with the protective sheets 79 and the printed wiring board 67 is housed in a container 80. That is, the protective sheet 79 is arranged on each of both inner side surfaces of the container 80 extending in a long side direction and one of both inner side surfaces of the container 80 extending in a short side direction, and the printed wiring board 67 is arranged on the other of the both inner side surfaces. That is, the battery module 66 surrounded by the protective sheets 79 and the printed wiring board 67 is positioned in an inner space of the container 80. An opening of the container 80 is covered with a cover 81.

Instead of the adhesive tape 65, a heat-shrinkable tape may be used to fix the unit cells 91 of the battery module 66. In this case, the heat-shrinkable tape is wound around the battery module 66 after the protective sheets 79 are arranged on the both longitudinal side surfaces of the battery module 66, and then the heat-shrinkable tubing is thermally shrunk to tie the unit cells 91 of the battery module 66 together with the protective sheets 79 together.

In FIGS. 10 and 11, the unit cells 91 are connected in series, but the unit cells 91 may be connected in parallel to increase a battery capacity of the battery module 66. A plurality of the battery packs 90 may be connected in series and/or in parallel.

Also, a form of the battery pack 90 is appropriately changed according to its uses. The battery pack 90 is preferably used for a use that requires a good cycle characteristic under a large current. As concrete uses, a power supply of a digital camera and an on-board power supply used for vehicles such as two-wheeled to four-wheeled hybrid electric vehicles, two-wheeled to four-wheeled electric vehicles and motor-assisted bicycles can be cited. The battery pack 90 is particularly suitable for on-board uses. When the battery pack 90 is mounted on a vehicle and is used as a power source thereof, the battery pack 90 may recover a regenerative energy regenerated from a power of the vehicle.

FIG. 12 shows an example of an automobile 100 that is a kind of a vehicle and that comprises the battery pack 90 (see FIG. 10) of the non-aqueous electrolyte batteries 60A according to the first embodiment.

The battery pack 90 is installed in an engine room of the automobile 100. The installing position of the battery pack 90 is not limited to the engine room. For example, the battery pack 90 may also be positioned in a rear part of the automobile 100 or under seats of the automobile 100. In this example, the battery pack 90 is configured to recover a regenerative energy of a power of the vehicle. A motor/generator M/G is coupled to the wheels of the automobile 100, and the battery pack 90 is combined with a control unit 102 connected to the motor/generator M/G. The control unit 102 is configured to selectively supply an electric power of the battery pack 90 to the motor/generator M/G or recover a regenerative energy of a power of the vehicle to the battery pack 90.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A non-aqueous electrolyte battery comprising:
   a bipolar electrode unit including at least a bipolar electrode including a current collector including a first surface and an opposing second surface, a positive electrode active material layer provided on the first surface of the current collector, and a negative elec- trode active material layer provided on the second surface of the current collector; and an insulating layer covering the positive and negative electrode active material layers on the first and second surfaces of the current collector of the bipolar electrode and including a non-aqueous electrolyte, wherein the bipolar electrode unit is folded at every predetermined length to have a plurality of flat portions arranged to face each other and a plurality of bent portions arranged between the flat portions, each flat portion having one and the other ends in a direction of the predetermined length, and each bent portion connecting one of the one and the other ends of one of the two flat portions facing each other and the other of the one and the other ends of the other of the two flat portions, and wherein a thickness of one part of the insulating layer of the bipolar electrode, the one part being positioned on at least an outer side surface of each of the bent portions of the bipolar electrode unit, is set to be larger than a thickness of the other part of the insulating layer, the other part being positioned on each of the flat portions.

2. The non-aqueous electrolyte battery according to claim 1, wherein an increase in the thickness of the part of the insulating layer of the bipolar electrode positioned on the outer side surface of the bent portion relative to the thickness of the part of the insulating layer of the bipolar electrode positioned on the flat portion in the bipolar electrode unit is achieved by one of coating of an insulating material, attachment of a tape of an insulating material, and dipping of the bent portion in a melted insulating material.

3. The non-aqueous electrolyte battery according to claim 1, wherein a reaction potential present near 1.5 V in the negative electrode active material layer of the bipolar electrode.

4. The non-aqueous electrolyte battery according to claim 1, wherein the positive electrode active material layer of the bipolar electrode includes a positive electrode current collector and a positive electrode material layer carried on at least one side surface of the positive electrode current collector, the negative electrode active material layer of the bipolar electrode includes a negative electrode current collector and a negative electrode material layer carried on at least one side surface of the negative electrode current collector, and each of the positive electrode current collector and the negative electrode current collector includes aluminum.

5. The non-aqueous electrolyte battery according to claim 4, wherein each of the positive electrode material layer of the positive electrode active material layer and the negative electrode material layer of the negative electrode active material layer contains a material being capable of occlusion and emission of lithium ions.

6. The non-aqueous electrolyte battery according to claim 1, wherein the bipolar electrode unit includes a plurality of bipolar electrodes stacked next to each other, and one insulating layer of one of two bipolar electrodes next to each other and one insulating layer of the other of the two bipolar electrode next to each other are common to the two bipolar electrodes next to each other.

7. A non-aqueous electrolyte battery pack comprising:

a plurality of non-aqueous electrolyte batteries bound together and electrically connected in series, in parallel, or in a combination of in series and in parallel;

a pair of positive electrode side lead and negative electrode side lead common to the non-aqueous electrolyte batteries; and a protective circuit connected to the non-aqueous electrolyte batteries and configured to detect an abnormal operation of the non-aqueous electrolyte batteries and to avoid the abnormal operation of the non-aqueous electrolyte batteries, wherein each of the non-aqueous electrolyte batteries includes a case having an internal space, a bipolar electrode unit arranged in the internal space of the case and including at least a bipolar electrode including a current collector including a first surface and an opposing second surface, a positive electrode active material layer provided on the first surface of the current collector, and a negative electrode active material layer provided on second surface of the current collector, and an insulating layer covering the positive and negative electrode active material layers on the first and second surfaces of the current collector of the bipolar electrode and including a non-aqueous electrolyte, wherein the bipolar electrode unit is folded at every predetermined length to have a plurality of flat portions arranged to face each other and a plurality of bent portions arranged between the flat portions, each flat portion having one and the other ends in a direction of the predetermined length, and each bent portion connecting one of the one and the other ends of one of the two flat portions facing each other and the other of the one and the other ends of the other of the two flat portions, and wherein a thickness of one part of the insulating layer of the bipolar electrode, the one part being positioned on at least an outer side surface of each of the bent portions of the bipolar electrode unit is set to be larger than a thickness of the other part of the insulating layer, the other part being positioned on each of the flat portions.

8. The non-aqueous electrolyte battery pack according to claim 7, wherein an increase in the thickness of the part of the insulating layer of the bipolar electrode positioned on the outer side surface of the bent portion relative to the thickness of the part of the insulating layer of the bipolar electrode positioned on the flat portion in the bipolar electrode unit of each of the non-aqueous electrolyte batteries is achieved by one of coating of an insulating material, attachment of a tape of an insulating material, and dipping of the bent portion in a melted insulating material.

9. The non-aqueous electrolyte battery pack according to claim 7, wherein a reaction potential present near 1.5 V in the negative electrode active material layer of the bipolar electrode of the bipolar electrode unit of each of the non-aqueous electrolyte batteries.

10. The non-aqueous electrolyte battery pack according to claim 7, wherein the positive electrode active material layer of the bipolar electrode of the bipolar electrode unit of each of the non-aqueous electrolyte batteries includes a positive electrode current collector and a positive electrode material layer carried on at least one side surface of the positive electrode current collector, the negative electrode active material layer of the bipolar electrode of the bipolar electrode unit of each of the non-aqueous electrolyte batteries includes a negative electrode current collector and a negative electrode material layer carried on at least one side surface of the negative electrode current collector, and each of the positive electrode current collector and the negative electrode current collector includes aluminum.

11. The non-aqueous electrolyte battery pack according to claim 10, wherein each of the positive electrode material layer of the positive electrode active material layer and the negative electrode material layer of the negative electrode active material layer contains a material being capable of occlusion and emission of lithium ions.

12. The non-aqueous electrolyte battery pack according to claim 7, wherein the bipolar electrode unit of each of the non-aqueous electrolyte batteries includes a plurality of bipolar electrodes stacked next to each other, and
    one insulating layer of one of two bipolar electrodes next to each other and one insulating layer of the other of the two bipolar electrode next to each other are common to the two bipolar electrodes next to each other.

13. A vehicle comprising the battery pack according to claim 7.

14. The vehicle according to claim 13, wherein the battery pack is configured to recover a regenerative energy of a power of the vehicle.

15. The non-aqueous electrolyte battery according to claim 1, wherein the one part of the insulating layer, having a thickness larger than a thickness of the other part of the insulating layer, is located in an outermost of the bent portion.

16. The non-aqueous electrolyte battery pack according to claim 7, wherein the one part of the insulating layer, having a thickness larger than a thickness of the other part of the insulating layer, is located in an outermost of the bent portion.

\* \* \* \* \*